United States Patent
Merz et al.

(10) Patent No.: US 12,090,835 B2
(45) Date of Patent: Sep. 17, 2024

(54) ARRANGEMENT OF AN AIR GUIDING ELEMENT MADE OF FOAM ON A COOLER ELEMENT, AND COOLER ELEMENT AND AIR GUIDING ELEMENT MADE OF FOAM

(71) Applicant: VOLKSWAGEN AKTIENGESELLSCHAFT, Wolfsburg (DE)

(72) Inventors: Thorsten Tobias Merz, Lehre (DE); Tomas Schorn, Wolfsburg (DE); Mario Ippoliti, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 153 days.

(21) Appl. No.: 17/290,205

(22) PCT Filed: Oct. 17, 2019

(86) PCT No.: PCT/EP2019/078239
§ 371 (c)(1),
(2) Date: Apr. 29, 2021

(87) PCT Pub. No.: WO2020/088947
PCT Pub. Date: May 7, 2020

(65) Prior Publication Data
US 2022/0016971 A1    Jan. 20, 2022

(30) Foreign Application Priority Data

Oct. 30, 2018    (DE) .................... 10 2018 218 520.4

(51) Int. Cl.
*B60K 11/00*    (2006.01)
*B60K 11/06*    (2006.01)
*B60K 11/08*    (2006.01)

(52) U.S. Cl.
CPC .............. *B60K 11/08* (2013.01); *B60K 11/06* (2013.01)

(58) Field of Classification Search
CPC ................................ B60K 11/08; B60K 11/06
(Continued)

(56) References Cited

U.S. PATENT DOCUMENTS

| 4,566,407 A | * | 1/1986 | Peter | ...................... | B60K 11/08 |
| | | | | | 123/563 |
| 8,196,978 B2 | * | 6/2012 | Shin | ..................... | B62D 25/084 |
| | | | | | 293/115 |

(Continued)

FOREIGN PATENT DOCUMENTS

| CN | 101941376 | 1/2011 |
| CN | 102077254 | 5/2011 |

(Continued)

OTHER PUBLICATIONS

International Search Report of PCT Application No. PCT/EP2019/078239, dated Apr. 15, 2020.

(Continued)

*Primary Examiner* — Hau V Phan
(74) *Attorney, Agent, or Firm* — PEARL COHEN ZEDEK LATZER BARATZ LLP

(57) ABSTRACT

The invention relates to an arrangement of an air guiding element (12) made of foam on a cooler element (14) in a front end (16) of a motor vehicle (10), wherein the air guiding element (12) extends up to the cooler element (14) when viewed in the longitudinal direction of the vehicle, and the cooler element (14) has at least in an outer partial section an elastic seal (52) having a first sealing section (54), wherein the air guiding element (12) bears against the first sealing section (54) in such a manner that the first sealing section (54) is brought into a tensioned position to the rear (Continued)

by the air guiding element (12) when viewed in the longitudinal direction of the vehicle. The invention further relates to a cooler element (14) for arrangement in a front end (16) of a motor vehicle (10) and to an air guiding element (12) made of foam.

6 Claims, 4 Drawing Sheets

(58) Field of Classification Search
USPC .......................................................... 180/68.1
See application file for complete search history.

(56) References Cited

U.S. PATENT DOCUMENTS

| | | | |
|---|---|---|---|
| 8,485,295 B2 * | 7/2013 | Mildner | B62D 25/084 |
| | | | 180/68.1 |
| 9,333,849 B2 * | 5/2016 | Kabbes | B60K 11/08 |
| 9,840,144 B2 | 2/2017 | Aizawa et al. | |
| 9,969,342 B2 * | 5/2018 | Klop | B60R 19/52 |
| 10,596,897 B2 | 3/2020 | Wallrabe et al. | |
| 2001/0027883 A1 | 10/2001 | Sasano et al. | |
| 2006/0102109 A1 * | 5/2006 | Becker | F01P 11/10 |
| | | | 62/239 |
| 2009/0039674 A1 | 2/2009 | Hassdenteufel et al. | |
| 2009/0277707 A1 * | 11/2009 | Ballard | F04D 25/06 |
| | | | 340/384.3 |
| 2011/0000728 A1 | 1/2011 | Mildner | |
| 2012/0043051 A1 * | 2/2012 | Kurokawa | B60K 11/04 |
| | | | 165/41 |
| 2014/0291056 A1 * | 10/2014 | Takanaga | B60R 19/52 |
| | | | 180/274 |
| 2015/0068825 A1 | 3/2015 | Berthevas et al. | |
| 2016/0207419 A1 * | 7/2016 | Ohashi | B60L 3/0061 |
| 2016/0368364 A1 | 12/2016 | Aoki | |
| 2017/0204773 A1 | 7/2017 | Tucker et al. | |
| 2018/0072151 A1 * | 3/2018 | Wallrabe | B60K 11/08 |
| 2018/0347909 A1 * | 12/2018 | Shimota | B60K 11/04 |

FOREIGN PATENT DOCUMENTS

| | | |
|---|---|---|
| CN | 104080693 A | 10/2014 |
| CN | 107813697 | 3/2018 |
| DE | 198 31 256 A1 | 1/2000 |
| DE | 10 2006 053 169 A1 | 5/2008 |
| DE | 10 2009 031 746 A1 | 1/2011 |
| DE | 10 2011 119542 | 5/2013 |
| DE | 11 2015 002 049 B4 | 8/2017 |
| DE | 10 2016 117 058 A1 | 3/2018 |
| EP | 1698520 | 9/2006 |
| FR | 2 553 826 A1 | 4/1985 |
| FR | 3 013 302 A1 | 5/2015 |
| JP | 2007 326431 A | 12/2007 |

OTHER PUBLICATIONS

Search Report for Chinese Patent Application No. CN201980072557, dated Oct. 28, 2023.
Search Report for Chinese Patent application No. 201980072557.7, dated May 23, 2024.

* cited by examiner

ARRANGEMENT OF AN AIR GUIDING ELEMENT MADE OF FOAM ON A COOLER ELEMENT, AND COOLER ELEMENT AND AIR GUIDING ELEMENT MADE OF FOAM

CROSS-REFERENCE TO RELATED APPLICATIONS

This application is a National Phase Application of PCT International Application No. PCT/EP2019/078239, International Filing Date Oct. 17, 2019, claiming priority of German Patent Application No. 10 2018 218 520.4, filed Oct. 30, 2018, which is hereby incorporated by reference.

FIELD OF THE INVENTION

The invention relates to an arrangement of an air guiding element made of foam on a cooler element in a front end of a motor vehicle. The invention also relates to a cooler element, in particular a water cooler, and an air guiding element made of foam.

BACKGROUND OF THE INVENTION

DE 198 31 256 A1 discloses a holder for a heat exchanger of motor vehicles, in which the heat exchanger can be a charge air cooler, a condenser, or an oil cooler. The holder comprises a frame which forms an air guiding frame extending from the cooler to an air inlet opening. The frame can be formed as a foamed molded part made of thermoplastic foam particles. The heat exchanger can be pushed into the frame. For this purpose, the frame comprises two side legs which are spaced apart from one another, in the inner sides of which guides formed as grooves are provided in order to be able to insert the heat exchanger in a drawer-like manner and to hold it between the two side legs of the frame. The grooves are intended to ensure sufficient tightness for the application without the need for a sealant between the frame and the heat exchanger.

DE 11 2015 002 049 B4 discloses an air guide for a motor vehicle, the air guide having a frame with two openings. The air guide can be made of polypropylene. The first opening is provided for the inlet of an air flow coming from outside the motor vehicle and the second opening is provided for guiding the air flow to an air filter housing. A seal is formed integrally with the air guide or the air filter housing and is intended to produce the seal between the air filter housing and the air guide. The seal is formed in particular in the form of a bellows.

DE 10 2009 031 746 A1 discloses a cooling air guiding device having a first guide component and a second guide component, the second guide component having a material that is more easily deformable than the first guide component. In particular, the first guide component and the second guide component are formed as injection molded parts made of plastics material. In particular, a circumferential seal is arranged between a water cooler and the second guide component, which seal is brought into contact with a flange section on the guide component side.

DE 10 2016 117 058 A1 discloses a multi-part air guide for a motor vehicle, the air guide having a lower foam part, an upper foam part, and lateral injection-molded parts connecting the lower and the upper foam parts. The upper foam part should be shaped such that the air guide bears externally adjacent against a cooler.

SUMMARY OF THE INVENTION

The invention is based on the object of providing an arrangement of an air guiding element made of foam on a cooler element, and cooler element and air guiding element made of foam, which are functionally improved.

The object is achieved according to the invention with the features of the independent claims. Further practical embodiments and advantages of the invention are described in connection with the dependent claims.

The invention relates to an arrangement of an air guiding element made of foam on a cooler element in a front end of a motor vehicle. The air guiding element extends in the form of an open or closed frame from an air inlet in the region of a grille (in particular a cooler protection grille and/or a ventilation grille in a bumper cover) in the front end of a motor vehicle, viewed in the longitudinal direction of the vehicle, to the rear up to the cooler element, the region between the grille and the cooler element enclosing in such a sealing manner that all or a large part of the air flow flowing in through the grille reaches the cooler element. A lateral flow of air past the air guiding element and/or the cooler element is thus counteracted with the air guiding element. The air guiding element is made of foam, in particular from expanded polypropylene foam (EPP foam). In particular, the material has a density of at least 30 g/l, values between 30 g/l and 60 g/l being particularly preferred, and values between 35 g/l and 50 g/l being particularly preferred. The air guiding element is also preferably formed so as to be integral. Air guiding elements made of foam have a low component weight and are therefore particularly well suited for use in electric vehicles, in particular with regard to range optimization.

In the present case, a cooler element is understood to mean in particular an element of an air conditioning/cooler package arranged in a front end. This includes in particular a water cooler, a condenser, a cooler blind, and/or a fan casing. The cooler element preferably comprises at least one water cooler.

The cooler element has an elastic seal having a first sealing section at least in an outer partial section, in particular on its circumference and in particular on a frame surrounding the cooler element on the outside. The seal is made in particular of rubber, preferably of EPDM. According to the invention, the air guiding element bears against the first sealing section such that the first sealing section is brought into a position that is tensioned to the rear when viewed in the longitudinal direction of the vehicle by means of the air guiding element.

In other words, by means of the air guiding element, the first sealing section of the seal is tensioned to the rear in an end assembly position with respect to a pre-assembly position. A tensioned position to the rear should not necessarily mean that the seal, viewed in the longitudinal direction of the vehicle, is oriented to the rear in the longitudinal direction of the vehicle starting from the cooler element, but rather it means merely the relative position of the first sealing section of the elastic seal of the end assembly position with respect to a pre-assembly position by interacting with the air guiding element. As will be described below in connection with the cooler element, in a pre-assembly position, the first sealing section extends in particular partially to the front in the longitudinal direction of the vehicle.

As a result of the tension of the first sealing section generated by means of the air guiding element, the latter bears fully and securely against the air guiding element. At the same time, the elastic, tensioned first sealing section of the first seal allows for vibration decoupling between the air guiding element and the cooler element. This is particularly advantageous when the cooler element is mounted in the front end in a swinging manner. The media (for example coolant) flowing through the cooler element and a cooler fan can be set into vibration and thus the cooler element itself can be set into vibration. Such vibrations can be caused both by driving and by the media flow and/or the cooling fan running. With regard to the cooling fan, it should also be taken into account that this can be completely switched off or that it can also be operated at different speeds. This in turn leads to different vibrational excitations and to the requirement of special measures with regard to a vibrating mounting of the air conditioning/cooler package. For these reasons, the entire air conditioning/cooler package is mounted in a swinging manner, i.e. decoupled from the vehicle body. Due to the design according to the invention, these vibrations are not transmitted or are transmitted only to a small extent from the cooler element to the air guiding element or the body, and undesired noise generation is thus avoided.

In a practical embodiment of the arrangement according to the invention, the cooler element has a further partial section having a second seal or a second sealing section and the air guiding element bears against the second seal or the second sealing section such that the second seal or the second sealing section is fixed with respect to a further component in an at least force-fit manner. The second seal or the second sealing section extends in particular starting from the cooler element only in the vertical direction of the vehicle or only in the longitudinal direction of the vehicle or only in the transverse direction of the vehicle. Such a second seal or such a second sealing section can be used in particular when there is little installation space, if a tensioning to the rear by means of the air guiding element is not possible due to a lack of space. Due to the force-fit fixation, however, a good seal between the air guiding element and the cooler element is also achieved in the region of the second seal or the second sealing section. The force-fit fixation takes place in particular in that the air guiding element fixes the second seal or the second sealing section with respect to a further component arranged in the front end, for example with respect to an element of an underbody paneling.

As already mentioned above, it is advantageous if the cooler element is mounted in the front end in a manner that is decoupled from vibrations from components fixed to the body. In particular such that when the vehicle is used as intended, the tightness between the cooler element and the air guiding element is not impaired even while the cooler element vibrates or when the cooler element and the air guiding element move relative to one another. For this purpose, the cooler element can in particular be at least partially surrounded by a frame which is indirectly connected to body-mounted components via elastic and/or damping connecting elements and is thus decoupled from components that are fixed to the body and in particular the crash management system in terms of vibration. The connecting elements are preferably made from an elastomer.

The invention also relates to an arrangement as described above or an arrangement of an air guiding element made of foam on a cooler element in a front end of a motor vehicle, a sound generator being arranged in the front end and an opening protruding through the air guiding element being formed in the air guiding element. The opening adjoins the sound generator directly such that sound can propagate from an outside region of the air guiding element into an inside region of the air guiding element. The sound generator is in particular a loudspeaker of a so-called "sound box," which is used in electric vehicles to imitate driving noises at low speeds, in particular in a speed range from 0 km/h to 30 km/h, in which in purely electrically operated vehicles almost no noise can be perceived, in particular because there are almost no rolling noises. The sound generator is preferably arranged at least partially in the vertical direction of the vehicle and in the transverse direction of the vehicle outside the air guiding element and is thus located outside the flow cross section for the air flowing from the grille in the direction of the cooler element.

For the targeted emitting of the imitation noises, the sound generator and/or the opening are arranged and/or formed such that the sound is emitted at least partially in the longitudinal direction of the vehicle to the front from the opening. Alternatively or in addition to this, the opening is formed in a funnel shape. A funnel-shaped opening preferably widens from an outside region of the air guiding element in the direction of an inside region of the air guiding element, so that the emitted sound is widely scattered.

In a further practical embodiment of the arrangement according to the invention, the sound generator is arranged in a sealing manner with respect to the air guiding element such that the sound is emitted completely or largely through the opening. Thus, on the one hand, the sound is directed particularly efficiently toward the center of the vehicle or the front of the vehicle. On the other hand, the effect is that as little air as possible, which flows from the grille in the direction of the cooler element, can escape in the region of the sound generator.

In order to avoid damage to the cooler element and in particular to the water cooler as far as possible, the sound generator and the cooler element, viewed in the longitudinal direction of the vehicle, are arranged next to one another without overlapping in the transverse direction of the vehicle. In this case, in the event of a—for example crash-induced—relative movement in the longitudinal direction of the vehicle, the sound generator can slide past the cooler element without collision, thereby avoiding damage to the cooler element. In particular, damage to the cooler element can thus be avoided as far as possible, which means that expensive and complex repairs of the cooler element can be dispensed with.

The invention also relates to a cooler element for arrangement in a front end of a motor vehicle, wherein the cooler element has an elastic seal in at least one partial section of the circumference thereof, which in the unloaded state, i.e. in a pre-assembly position, is at least partially oriented to the front when viewed in the longitudinal direction of the vehicle and in particular is designed in such a way that it can be brought into a tensioned position by means of a suitable application of force—as in an end assembly position with an air guiding element. The cooler element is in particular a part of an air conditioning/cooler package and in particular at least one water cooler. The elastic seal is preferably arranged on a frame surrounding the cooler element on its circumference and is further preferably molded thereon. The frame can be made of a plastics material and can be easily clipped onto the cooler element.

The partial section having the seal preferably extends over at least two sides of the cooler element and in particular in a U-shape around the cooler element, the seal being arranged on a top of the cooler element and on the sides extending in the vertical direction of the vehicle. In a further partial section, the cooling element can also have a seal or a second sealing section which is arranged on the underside of the cooler element and, starting from the cooler element, extends to the front in the longitudinal direction of the vehicle.

The invention also relates to an air guiding element made of foam having an opening protruding through the air guiding element, wherein the opening widens in a funnel shape starting from an outside region of the air guiding element in the direction of an inside region of the air guiding element and/or the opening is oriented toward the front of the vehicle at least in the section directed toward the inside region. Such an air guiding element is preferably arranged together with a sound generator in a front end, as described above, so that the opening guides the sound generated by the sound generator into the center of the vehicle and to the front, viewed in the longitudinal direction of the vehicle, so that other road users can perceive the motor vehicle at an early stage.

BRIEF DESCRIPTION OF THE DRAWINGS

Further practical embodiments of the invention are described below in connection with the drawings. In the drawings.

DETAILED DESCRIPTION OF THE INVENTION

Figure 1:
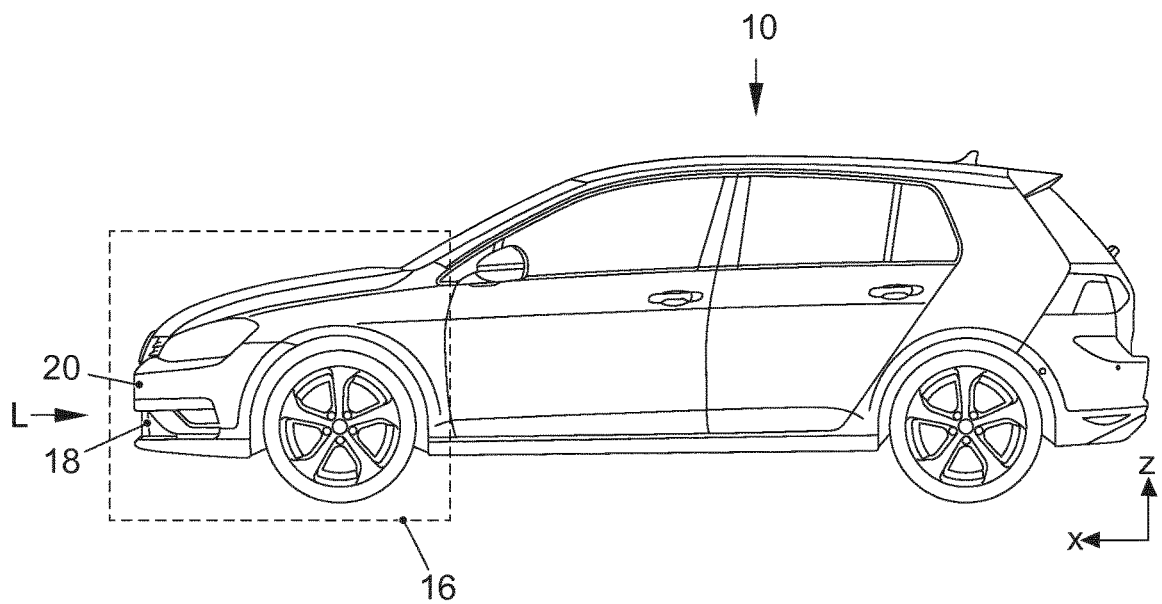
FIG. 1 shows a motor vehicle in a side view.

In FIG. 1, a motor vehicle 10 is shown in a side view. An arrangement according to the invention comprising an air guiding element 12 and a cooler element 14 is arranged within a front end 16 of the motor vehicle 10, which is indicated by dashed lines. The air guiding element 12 extends in the front end 16 from a grille (in particular a cooler protection grille 18 as shown in FIG. 1 or, alternatively, a ventilation grille), which is part of an outer panel 20 of the vehicle 10, up to the cooler element 14 (cf. FIG. 2). The air guiding element 12 is formed like a frame and encloses the region between the cooler protection grille 18 and the cooler element 14. It serves to guide the air flowing from the cooler protection grille 18 in the direction L to the cooler element 14.

Figure 2:
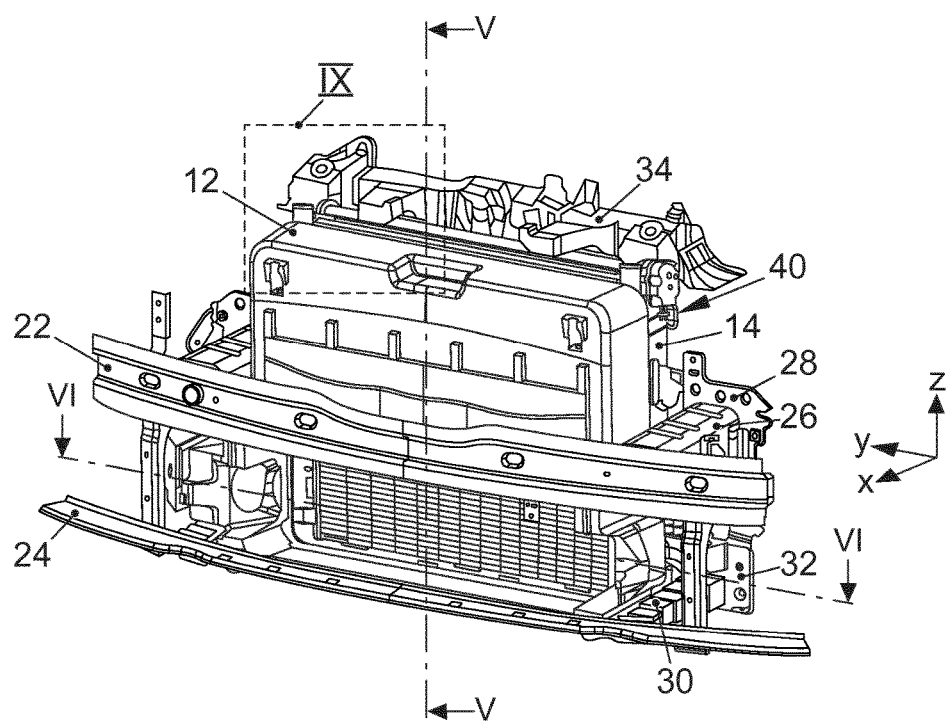
FIG. 2 shows an inventive arrangement of an air guiding element according to the invention and a cooler element according to the invention in a front end in a perspective view obliquely from the front.
Figure 3:
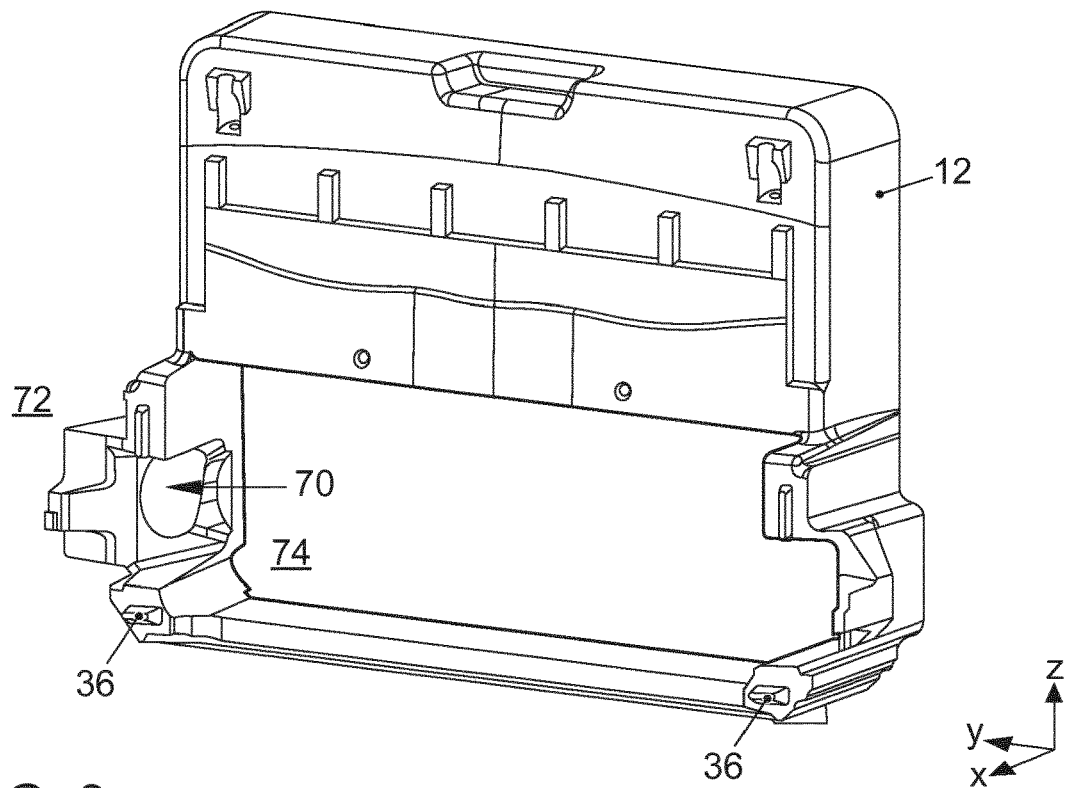
FIG. 3 shows the air guiding element according to the invention from FIG. 2 in a perspective view obliquely from the front.

An arrangement of the air guiding element 12 and the cooler element 14 in the front end 16 is shown in FIG. 2 in a view obliquely from the front without the outer panel element 20. A main bumper crossmember 22 and a pedestrian protection crossmember 24 arranged underneath it in the vertical direction of the vehicle (z direction) can be seen, which are arranged directly behind the cooler protection grille 18 (cf. FIG. 5) when viewed in the longitudinal direction of the vehicle (x direction). The main bumper crossmember 22 is connected to bulkhead plates 28 for connection to longitudinal members (not shown) via deformation elements 26 extending to the rear in the longitudinal direction of the vehicle (x direction). The pedestrian protection crossmember 24 is also connected via deformation elements 30 to lower plate sections (not shown) of the bulkhead plates 28. The upper deformation element 26 and the lower deformation element 30 are usually each welded to the associated bulkhead plate 28. The main bumper crossmember 22, the pedestrian protection crossmember 24, the deformation elements 26, 30, and the bulkhead plates 28 are components that are fixed to the body and are parts of the so-called crash management system.

Figure 4:
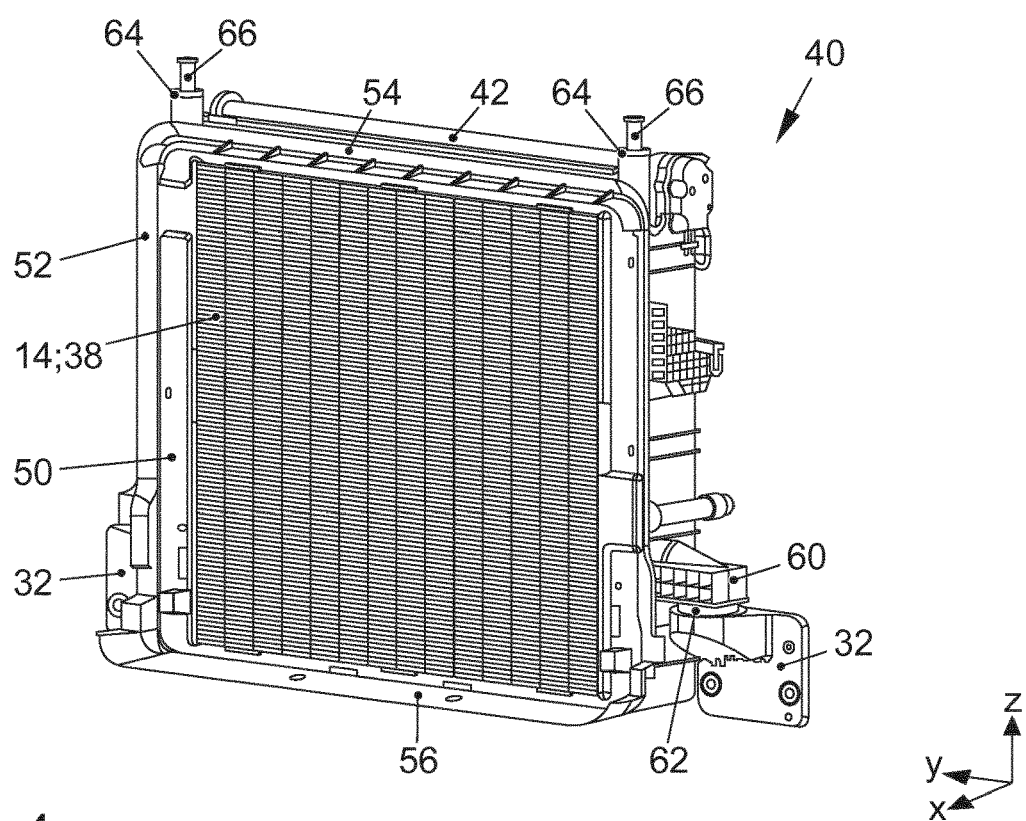
FIG. 4 shows an air conditioning/cooler package having the cooler element according to the invention from FIG. 2.

In FIGS. 2 and 4, an air conditioning/cooler package mounting plate 32 is shown, which is made of plastics material in the embodiment shown. Such an air conditioning/cooler package mounting plate 32 is arranged in the longitudinal direction of the vehicle behind the bulkhead plate 28 and is firmly connected thereto. In the embodiment shown, the two air conditioning/cooler package mounting plates 32 (see FIG. 4) are each located behind the associated bulkhead plate 28 during assembly and are screwed thereon. The respective bulkhead plate 28 having the air conditioning/cooler package mounting plate 32 attached thereto is then connected to the lower subframe of the motor vehicle (not shown). The air conditioning/cooler package mounting plate 32 does not belong to the crash management system.

The air guiding element 12 extends in a frame-like manner from the main bumper crossmember 22 in the longitudinal direction of the vehicle (x direction) to the rear up to the cooler element 14 and to a lock carrier 34. The air guiding element 12 is firmly connected to the main bumper crossmember 22 and the pedestrian protection crossmember 24. For connection to the pedestrian protection crossmember 24, a protruding wedge 36 is formed on a lower section of the air guiding element 12. The connection to the main bumper crossmember 22 takes place by means of weld studs (not shown). In the present case, the air guiding element 12 is made integrally of foam.

In the present case, the cooler element 14 is a water cooler 38, which is part of an air conditioning/cooler package 40. As can be clearly seen in FIGS. 2 and 5-6, the air conditioning/cooler package 40 has the water cooler 38, a cooler blind 42, a condenser 44, and a fan casing 46. In addition, a stone protection element 48 (cf. FIG. 5) is arranged in front of the water cooler 38 in the longitudinal direction of the vehicle (x direction).

In an outer partial section of its circumference, the cooler element 14 has a frame 50 which in the present case extends around the entire circumference of the cooler element 14. The frame 50 is clipped to the cooler element 14. An elastic seal 52 having a first sealing section 54 is arranged on the frame. The seal 52 is injection molded onto the frame 50 in this case. In the present case, the first sealing section 54 extends in a U shape on the two sides extending in the vertical direction of the vehicle (z direction) and on the top of the frame 50. The first sealing section 54 is oriented in an unloaded state, i.e. in a pre-assembly position, before interacting with the air guiding element 12, partially in the longitudinal direction of the vehicle (x direction) to the front and partially in the vertical direction of the vehicle (y direction).

Figure 5:
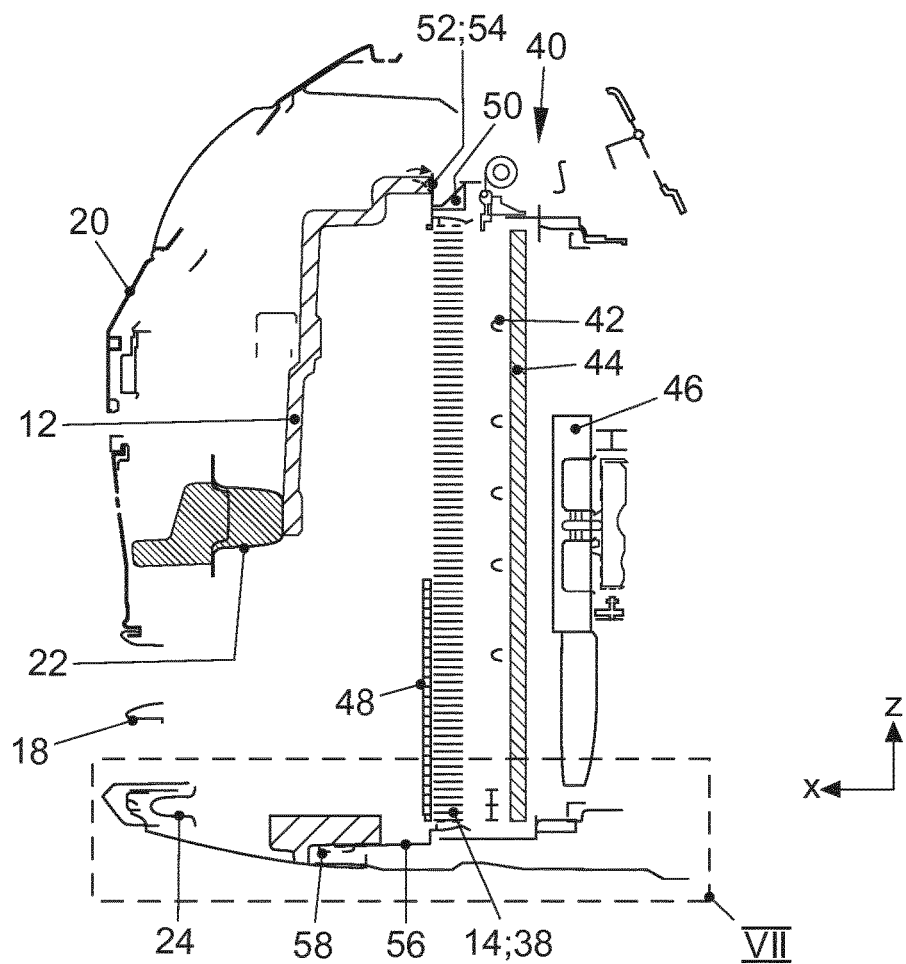
FIG. 5 shows the arrangement according to the invention from FIG. 2 having an outer panel in a section along line V-V from FIG. 2.
Figure 6:
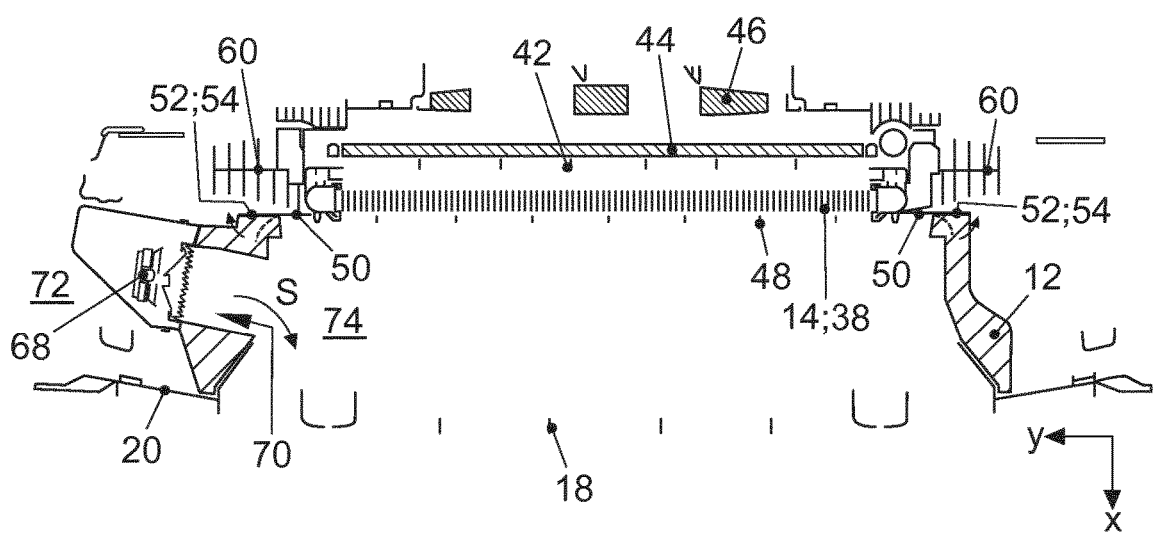
FIG. 6 shows the arrangement according to the invention from FIG. 2 in a section along line VI-VI from FIG. 2.
Figure 9:
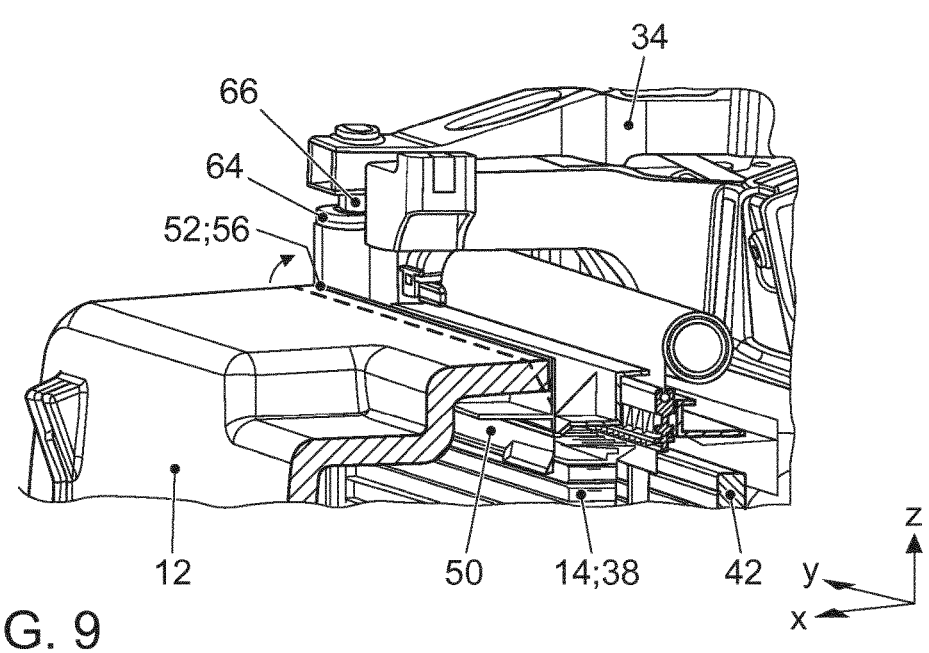
FIG. 9 shows the region marked IX from FIG. 2 in an enlarged illustration.

With the arrangement of the air guiding element 12 on the cooler element 14, the first sealing section 54 is brought into a position that is tensioned to the rear with respect to the unloaded state. The difference between the pre-assembly position and the end assembly position is indicated in FIGS. 5, 6 and 9 by means of the arrow. In the final assembly position, the first sealing section 54 is oriented in the vertical direction of the vehicle (z direction) and bears directly against the air guiding element 12 in the tensioned position.

In addition, the seal 50 has a second sealing section 56, which in the present case is arranged on the underside of the frame. This second sealing section 56 extends in this case largely horizontally in the longitudinal direction of the vehicle (x direction) to the front. In the arrangement together with the air guiding element 12, the air guiding element 12 bears against the second sealing section 54 such that the latter is fixed with respect to a further component 58 in an at least force-fit manner.

Figure 7:
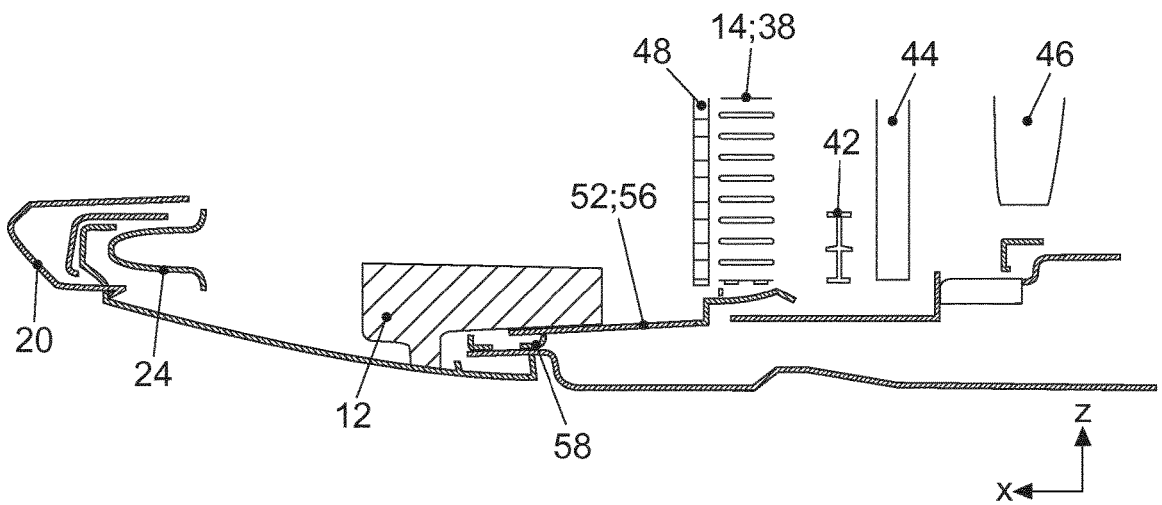
FIG. 7 shows the region marked VII from FIG. 5 in an enlarged illustration in a first embodiment.
Figure 8:
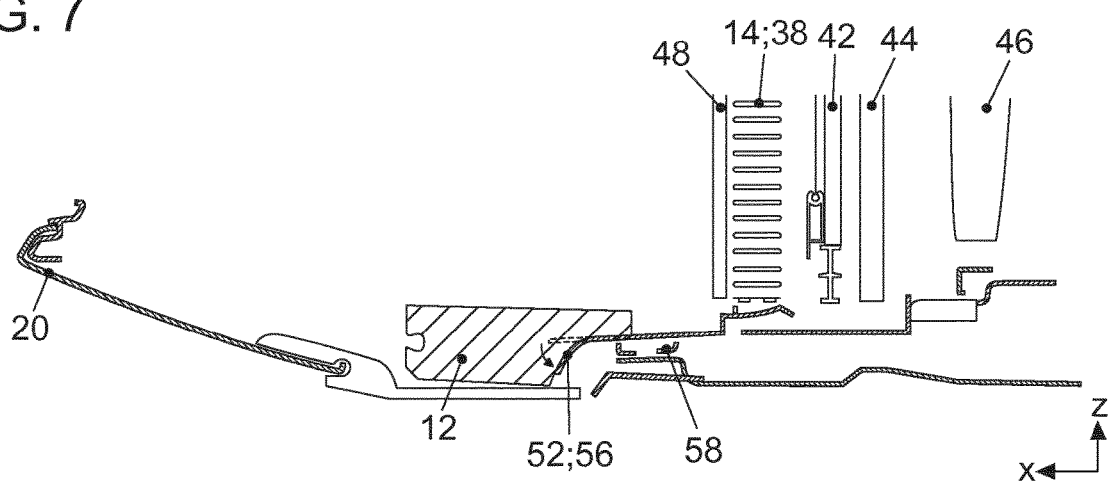
FIG. 8 shows the region marked VII from FIG. 5 in an enlarged illustration in a second embodiment.

This is shown in detail in FIGS. 7 and 8. A first embodiment is shown in FIG. 7, in which the installation space in the front end 16 is designed such that the second sealing section 56 of the air guiding element 14 is pressed and thereby fixed in a force-fit manner only in the vertical direction of the vehicle (z direction) downward against the further component 58, in this case an underbody panel. In the second embodiment shown in FIG. 8, less installation space is available in the front end 16 and the air guiding element 12 bears with its underside closer against the cooler element 14. In this case, the second sealing section 56 is also partially tensioned to the rear in addition to a force-fit fixation with respect to the further component 56 (an underbody panel), which is indicated by the arrow.

In addition to a good seal due to the tension of the first sealing section 54, vibration decoupling of the cooler element 14 and the air guiding element 12 is also achieved. The cooler element 14 is also itself mounted in the front end 16 in a manner that is decoupled from vibrations from components fixed to the body. For this purpose, the cooler element 14 has outwardly extending arms 60 in each case in the transverse direction of the vehicle (y direction) having plug-in sections (not visible) that extend downward in the vertical direction of the vehicle for insertion into a corresponding opening in the air conditioning/cooler package mounting plate 32 (cf. FIG. 4). For the purpose of vibration decoupling, a vibration-damping elastomer material 62 is arranged between the plug-in sections and the air conditioning/cooler package mounting plate 32. In the embodiment shown, the elastomer material 62 is provided in the respective opening of the air conditioning/cooler package mounting plate 32. The fixation of the plug-in sections with respect to the air conditioning/cooler package mounting plate 32 takes place in the embodiment shown by means of pins (not shown), which extend from below through the openings in the air conditioning/cooler set mounting plate 32 and are firmly connected to the plug-in sections, for example by clipping. Analogously to this, there is a vibration-decoupled mounting in the upper region of the cooler element 14 via pins 66 received by elastomer elements 64, which are connected to the lock carrier 34, for example by clipping (cf. FIG. 4).

A sound generator 68 is additionally arranged in the front end of the vehicle 16 (cf. FIGS. 2 and 6). The sound generator 68 is arranged on the outside of the air guiding element 12 in the transverse direction of the vehicle (y direction), the air guiding element 12 having an opening 70 protruding through the air guiding element 12, which extends from an outside region 72 to an inside region 74 of the air guiding element 12. Sound emitted by the sound generator 68 is guided through the opening 70 in the direction of the center of the front end 16. In addition, the opening 70 is oriented such that the sound is emitted at least partially in the longitudinal direction of the vehicle (x direction) along the arrow S (cf. FIG. 6) to the front. The opening widens in a funnel shape from the outside region 72 to the inside region 74. The sound generator 68 bears against the air guiding element 12 in such a sealing manner that as much as possible of the sound is guided through the opening 70.

As can be clearly seen in FIG. 6, the sound generator 68 and the cooler element 14 are arranged next to one another when viewed in the transverse direction of the vehicle (y direction) such that they slide past one another during a relative movement in the longitudinal direction of the vehicle (x direction), for example caused by a crash, and in particular the cooling element 14 is not damaged.

The features of the invention disclosed in the present description, in the drawings, and in the claims can be substantial both individually and in any combination for the implementation of the invention in its various embodiments. The invention can be varied within the scope of the claims and taking into account the knowledge of a person skilled in the art.

LIST OF REFERENCE SIGNS

10 Motor vehicle
12 Air guiding element
14 Cooler element
16 Front end
18 Cooler protection grille
20 Outer panel
22 Main bumper crossmember
24 Pedestrian protection crossmember
26 Deformation element
28 Bulkhead plate
30 Deformation element
32 Air conditioning/cooler package mounting plate
34 Lock carrier
36 Wedge
38 Water cooler
40 Air conditioning/cooler package
42 Cooler blind
44 Condenser
46 Fan casing
48 Stone protection element
50 Frame
52 Seal
54 First sealing section
56 Second sealing section
58 Another component
60 Arm
62 Elastomer
64 Elastomer
66 Pin
68 Sound generator
70 Opening
72 Outside region of the air guiding element
74 Inside region of the air guiding element

The invention claimed is:

1. An arrangement of an air guiding element made of foam on a cooler element in a front end of a motor vehicle,
wherein the air guiding element extends up to the cooler element when viewed in the longitudinal direction of the vehicle,
wherein the cooler element has an elastic seal having, at least in a first outer partial section, a first sealing section and, at least in a second outer partial section, a second sealing section that extends in a U-shape, wherein the air guiding element bears against the first sealing section in such a manner that the first sealing section is brought into a tensioned position to the rear by the air guiding element when viewed in a longitudinal direction of the vehicle, and wherein the air guiding element bears against the second sealing section such that the second sealing section is fixed with respect to a further component in an at least force-fit manner.

2. The arrangement according to claim 1, wherein the cooler element is stored in the front end so as to be vibration-decoupled from components fixed to the body.

3. The arrangement according to claim 1, wherein a sound generator is arranged in the front end, and wherein an opening is formed in the air guiding element, the opening directly adjoining the sound generator such that sound can propagate from an outside region of the air guiding element into an inside region of the air guiding element.

4. The arrangement according to claim 3, wherein the sound generator and/or the opening are arranged and/or formed such that the sound is emitted at least partially in the longitudinal direction of the vehicle to the front from the opening and/or that the opening is formed in a funnel shape.

5. The arrangement according to claim 3, wherein the sound generator is arranged in such a sealing manner with respect to the air guiding element such that the sound is emitted completely or largely through the opening.

6. The arrangement according to claim 3, wherein the sound generator and the cooler element, viewed in the longitudinal direction of the vehicle, are arranged next to one another without overlapping in a transverse direction of the vehicle.

* * * * *